US012017464B2

(12) United States Patent
Verdyck et al.

(10) Patent No.: US 12,017,464 B2
(45) Date of Patent: Jun. 25, 2024

(54) THERMAL PRINTING APPARATUS COMPRISING A COOLER

(71) Applicant: ARMOR, Nantes (FR)

(72) Inventors: Dirk Verdyck, Merksem (BE); Maxime Charrier, Trémentines (FR)

(73) Assignee: ARMOR, Nantes (FR)

( * ) Notice: Subject to any disclaimer, the term of this patent is extended or adjusted under 35 U.S.C. 154(b) by 1 day.

(21) Appl. No.: 18/257,247

(22) PCT Filed: Dec. 13, 2021

(86) PCT No.: PCT/EP2021/085543
§ 371 (c)(1),
(2) Date: Jun. 13, 2023

(87) PCT Pub. No.: WO2022/128946
PCT Pub. Date: Jun. 23, 2022

(65) Prior Publication Data

US 2023/0398789 A1 Dec. 14, 2023

(30) Foreign Application Priority Data

Dec. 14, 2020 (EP) .................................... 20213819

(51) Int. Cl.
*B41J 2/335* (2006.01)
*B41J 2/175* (2006.01)
*B41J 2/325* (2006.01)

(52) U.S. Cl.
CPC ......... *B41J 2/3358* (2013.01); *B41J 2/17593* (2013.01); *B41J 2/325* (2013.01)

(58) Field of Classification Search
CPC .... B41J 29/377; B41J 2/3358; B41J 2/17593; B41J 2/325
See application file for complete search history.

(56) References Cited

U.S. PATENT DOCUMENTS 4,764,776 A 8/1988 Mugrauer et al.
4,778,290 A 10/1988 Coata et al.
(Continued)

FOREIGN PATENT DOCUMENTS

CH 553 662 A 9/1974
EP 0 029 313 A2 5/1981
(Continued)

OTHER PUBLICATIONS

International Search Report as issued in International Patent Application No. PCT/EP2021/085543, dated Mar. 24, 2022.
(Continued)

*Primary Examiner* — Kristal Feggins
(74) *Attorney, Agent, or Firm* — Pillsbury Winthrop Shaw Pittman LLP

(57) ABSTRACT

A thermal printing apparatus includes a frame, an endless ribbon to transport ink on its outer face, a coating device to coat the endless ribbon with ink, a printhead to print by thermal transfer a substrate with a part of the ink, a plurality of first rollers supporting and transporting the endless ribbon by its inner face along a path from the coating device to the printhead and from the printhead to the coating device in a cyclic manner, at least one first conveyor arranged to support the inner face of the endless ribbon between two adjacent first rollers along its path from the coating device to the printhead; the first conveyor including a plate fixed in translation and rotation with the frame and having a first convex surface supporting the inner face, a heat exchanger designed to cool down the first surface of the plate at a predefined temperature.

11 Claims, 6 Drawing Sheets

(56) References Cited

U.S. PATENT DOCUMENTS

| | | | | |
|---|---|---|---|---|
| 2004/0135870 | A1 | 7/2004 | Furuyama | |
| 2015/0002602 | A1* | 1/2015 | Hashimoto | B41J 35/06<br>347/214 |
| 2019/0299657 | A1* | 10/2019 | Mizutani | B65H 29/20 |
| 2021/0237490 | A1* | 8/2021 | Suzuki | B41J 11/0045 |

FOREIGN PATENT DOCUMENTS

| | | | |
|---|---|---|---|
| EP | 0 412 179 | A1 | 2/1991 |
| EP | 0 542 270 | A2 | 5/1993 |
| EP | 3 498 475 | A1 | 6/2019 |
| EP | 3 055 135 | B1 | 7/2019 |
| GB | 2 543 061 | A | 4/2017 |
| JP | S62-268672 | A | 11/1987 |
| WO | WO 2014/045207 | A1 | 3/2014 |

OTHER PUBLICATIONS

Written Opinion of the International Searching Authority as issued in International Patent Application No. PCT/EP2021/085543, dated Mar. 24, 2022.

* cited by examiner

THERMAL PRINTING APPARATUS COMPRISING A COOLER

CROSS-REFERENCE TO RELATED APPLICATIONS

This application is the U.S. National Stage of PCT/EP2021/085543, filed Dec. 13, 2021, which in turn claims priority to European patent application number 20213819.4 filed Dec. 14, 2020. The content of these applications are incorporated herein by reference in their entireties.

FIELD OF INVENTION

The present invention relates to a printing apparatus system, especially a printing apparatus comprising a ribbon capable of holding ink thereon.

BACKGROUND OF INVENTION

Current solutions involving a thermal transfer printing apparatus use a disposable already coated ribbon. One limitation of these solutions is that the ribbon needs to be replaced periodically as the end of the ribbon has been reached. Such replacement requires to stop the printer during a period of time, which could be very inconvenient for some applications, for example when the printer is a labeling machine in a production line.

To cope with the dispose of such used ribbon along with the remaining un-transferred ink, an alternative class of thermal transfer printing apparatus has been developed, using an endless ribbon instead of a spool of disposable ribbons.

EP3055135B1 teaches such printing apparatus wherein the endless ribbon is transported upon rollers. The described printing apparatus comprises a coating device to coat the ribbon with hot melted ink.

The ink layer applied to such endless ribbon shall be rejuvenated to ensure multiple printing: Only one ribbon is consequently used in a continuously manner and the remaining ink could be exploited again, reducing waste of material.

The endless ribbon is transported with rollers while a part of the ribbon is successively exposed to the thermal printhead and to the re-inking unit during its course. Hence, it shall be capable of withstanding a large number of cycles, for example million multiple cycles through the system. Between the re-inking unit and the thermal printhead, the ink shall recover its solid state, which is made possible during a cooling phase. The cooling phase is essential to provide a proper ink layer and impacts on the quality of printed data on the substrate.

US4764776 or EP0412179 discloses that the coated ink on the ribbon solidifies after coating. However, cooling is happening in the absence of thermal control and therefore subjected to environmental conditions during use such as moisture and room temperature.

CH553662 discloses a printing system equipped with a cooling unit using a fan placed in the vicinity of the ribbon to accelerate the solidification of the ink.

A first limitation of these systems is that the speed of printing may be limited. Indeed, above a limited speed, the coated hot melted ink cannot solidify, or may insufficiently solidify before reaching the printhead, which may negatively impact on the printing quality. Besides, cooling could be reached with time while increasing the path of the ribbon between the coater and the printhead, increasing the volume of such printing apparatus. Consequently, such printing apparatus have a high volume to travel a long distance between the re-inking station and the printhead to ensure solidification of the ink and therefore suitable printing performances.

A second limitation is that the printing process is not standardized. Depending on the ambient temperature, humidity, and the thermal features of the ink, the printhead shall be calibrated to ensure a high quality of printing. As a matter of fact, the ink is generally moisture and temperature sensitive: the range of ink may therefore be limited able to be used in such systems whereby the cooling phase could not be controlled.

A third limitation is the potential or inevitable miss alignment between transport rollers inducing unequal tension across the width of the ribbon. This unequal tension creates potential lateral move of part of the film and potential wrinkles, creases or folds.

US2004/135870 describes a cooling roller laterally mounted to rotate into contact with the back side of the thermal transfer film. In the same way, EP0029313 describes a cooling roller or an electric refrigeration element employing the Peltier effect to solidify the ink layer.

However, this solution does not avoid the mentioned drawbacks. Particularly, said solution does not provide an optimal heat transfer between the ink and the coiling roller and said solution inevitably leads to an increase in the volume of the printing apparatus as cooling dependents on contact surface between the ribbon and the roller, i.e., solidification of the ink depends on the coiling roller's diameter.

The present invention aims to provide a compact thermal transfer printing apparatus which overcome the mentioned limitations.

SUMMARY

According to a first aspect, the invention relates to a thermal transfer printing apparatus comprising:

- a coater to coat an endless ribbon with ink,
- a printhead to print by thermal transfer a substrate with a part of the ink coated on the endless ribbon,
- a conveyor system supporting and transporting the endless ribbon comprising ink along a first path from the coater to the printhead and along a second path from the printhead to the coater in a cyclic manner,
- at least one cooler configured to cool the coated ink on the endless ribbon at a first predefined temperature along a first portion of the first path of the endless ribbon.

The cooler advantageously improves the solidification of the hot melted ink coated on the ribbon. Another advantage is to allow the use of shorter ribbon and/or a higher speed of printing while keeping the printing apparatus compact. Another advantage is to ensure a fast solidification of the ink, independently of the ambient temperature and humidity rate.

In one embodiment, the printing apparatus further comprises at least one heater to heat the ink on the endless ribbon at a second predefined temperature along a second portion of the second path. The heater advantageously causes the remaining ink after printing to melt or to come closer of its melting point on the ribbon. The heater advantageously improves the coating and the replacement of the ink on the ribbon by the coater.

In one embodiment, the printing apparatus further comprises at least one heater to heat the ink on the endless ribbon at a third predefined temperature along a third portion located at least between the coater and the first portion of the first path. One advantage is to improve the homogeneity of the thickness of the ink on the band before the cooling of said ink. One advantage is to heat the ink on the ribbon before, during, and after coating to improve the coating and the uniformity of the thickness along the width and the length of the ribbon.

In one embodiment, the conveyor system comprises a first guiding element for supporting the ribbon, said first guiding element being coupled with the cooler in order to cool the coated ink on the ribbon supported by said first guiding element. One advantage of the first guiding element is to take advantage of the surface of contact between the first guiding element and the ribbon to cool the ink on the ribbon. The ink is cooled by the first guiding element through the ribbon.

In one embodiment, the first guiding element comprises a core having a cavity wherein a coolant is circulating in order to cool an outer face of the core, said outer face being arranged to support the ribbon.

In one embodiment, the conveyor system comprises a first conveyor comprising a first conveyor belt holding and transporting the endless ribbon on at least a part of the first portion. The first conveyor belt is guided by the first guiding element in such a manner that a face of the first guiding element faced the conveyor belt, said first conveyor belt acting as a thermal conductor while transporting the ribbon.

In one embodiment, the printing apparatus further comprises at least two rollers to hold and support the first conveyor belt. In one embodiment, said at least two rollers are coupled to the cooler to cool the ink through the rollers, through the ribbon and through the first conveyor belt.

In one embodiment, the conveyor system comprises a second guiding element for supporting the ribbon, said second guiding element being coupled with the heater in order to heat the coated ink on the ribbon supported by the second guiding element on the second portion. In one embodiment, the heater comprises an electric resistance to heat the second guiding element by Joule heating.

In one embodiment, the conveyor system comprises a second conveyor. Said second conveyor comprises a second conveyor belt holding and transporting the endless ribbon on the second portion and/or the third portion, said conveyor belt being guided by the second guiding element in such a manner that the outer face of the second guiding element faced the second conveyor belt, said second conveyor belt acting as a thermal conductor while transporting the ribbon.

In one embodiment, the printing apparatus comprises at least two rollers to hold and support the second conveyor belt, said rollers being coupled to the heater to heat the ink through the ribbon and through the second conveyor belt.

In one embodiment, the cooler comprises a heat exchanger. In one embodiment, the cooler comprises a Peltier heat pump. In embodiment, the heat exchanger comprises heat pipes.

In one embodiment, the first predefined temperature is ranging from 25 to 50° C. In one embodiment, the second predefined temperature is ranging from 50 to 130° C.

In one embodiment, the printing apparatus comprising a ribbon arranged on its path and ink to be carried by the ribbon, wherein the first predefined temperature is below the melting point of the ink. In one embodiment, the second predefined temperature is above the melting point of the ink. In one embodiment, the first guiding element and/or the second guiding element is a curving guide.

In one embodiment, the printing apparatus further comprises a thermal controller to control the temperature of the ink in the ribbon on a fourth portion of the path of the ribbon, the fourth portion of the path being located between the first portion and the printhead. In one embodiment, the thermal control heats and/or cools the ink at a third predefined temperature.

According to a second aspect, the invention relates to a method for thermally print a substrate comprising:

- transporting an endless ribbon holding ink thereon along a first path from a coater to a printhead and along a second path from the printhead to the coater in a cyclic manner;
- coating the endless ribbon with ink with the coater;
- printing by thermal transfer a substrate with a part of the ink coated on the endless ribbon with the printhead;
- actuating a cooler to cool down the coated ink on the endless ribbon at a first predefined temperature along a first portion of the first path of the endless ribbon.

In one embodiment, the method comprises actuating a heater to heat the ribbon to cause the ink on the band to melt on a portion of the path of the endless ribbon.

In one embodiment, the method is implemented by the printing apparatus according to the first aspect of the invention. In one embodiment, the method comprises the recovery of an excess portion of ink during replacing a portion of ink transferred to the substrate.

According to one aspect, the invention relates to a thermal transfer printing apparatus comprising:

- a frame,
- an endless ribbon, to transport ink on its outer face,
- a coating device to coat the endless ribbon with ink,
- a printhead to print by thermal transfer a substrate with a part of the ink coated on the endless ribbon,
- a plurality of first rollers supporting and transporting the endless ribbon by its inner face along a path from the coating device to the printhead and from the printhead to the coating device, preferably in a cyclic manner,
- A plate to support the inner face of the endless ribbon between two adjacent first rollers along its path from the coating device to the printhead; said plate being fixed in translation and in rotation with the frame and having optionally a first convex surface supporting the inner face of the ribbon;
- a heat exchanger designed to cool down the first surface of the plate at a first predefined temperature.

In one embodiment, the first convex surface of the plate is arranged in direct contact with the endless ribbon.

In one embodiment, the thermal transfer printing apparatus further comprises at least two second rollers; and a conveyor belt supported by at least two second rollers and by the first surface of the plate and arranged to support and transport the endless ribbon by its inner face. The second roller and the plate are arranged so that the first surface of the plate supports the endless ribbon through the conveyor belt.

In one embodiment, the thermal transfer printing apparatus further comprises at least one heater, fixed in translation with the frame, and arranged to heat a first portion of the endless ribbon at a second predefined temperature.

In one embodiment, the first portion of the endless ribbon comprises a coating zone of the ribbon wherein the ribbon is coated by the coating device or is in contact with the coating device.

In one embodiment, the plate comprises a frame having a cavity wherein a coolant is circulating in order to cool an outer face of the frame, said outer face being arranged to support the ribbon.

In one embodiment, the heater comprises a roller arranged to support the inner face of the ribbon on its circumferential surface and means for heating said circumferential surface of the roller.

In one embodiment, the means for heating said circumferential surface of the roller comprises an electric resistance or a thermal resistance to heat the second guiding element by Joule heating.

According to one aspect, the invention relates to a thermal transfer printing apparatus comprising:

a frame, an endless ribbon, to transport ink on its outer face, a coating device to coat the endless ribbon with ink, a printhead to print by thermal transfer a substrate with a part of the ink coated on the endless ribbon, a plurality of first rollers supporting and transporting the endless ribbon by its inner face along a path from the coating device to the printhead and from the printhead to the coating device in a cyclic manner, at least one cooling roller arranged to support the inner face of the endless ribbon between two adjacent first rollers along its path from the coating device to the printhead; said cooling roller comprising a shaft comprising pipes extending through the volume of the shaft and filled by a coolant;

a heat exchanger designed to cool down the coolant within the pipes of the cooling roller at a first predefined temperature.

According to another aspect, the invention relates to a method for thermally print a substrate comprising the steps of:

providing a thermal transfer printing apparatus according to the invention;

transporting the endless ribbon holding ink thereon from the coating device to the printhead and from the printhead to the coating device, preferably in a cyclic manner;

coating the outer face of the endless ribbon with ink with the coating device;

cooling the plate supporting the inner face of the endless ribbon to solidify the coated ink;

printing by thermal transfer a substrate with a part of the ink coated on the outer face of the endless ribbon with the printhead.

In one embodiment, the method further comprises actuating a heater to heat the ink on the ribbon above its melting point or above its glass transition temperature on both sides of the coating device.

DETAILED DESCRIPTION

Figure 1:
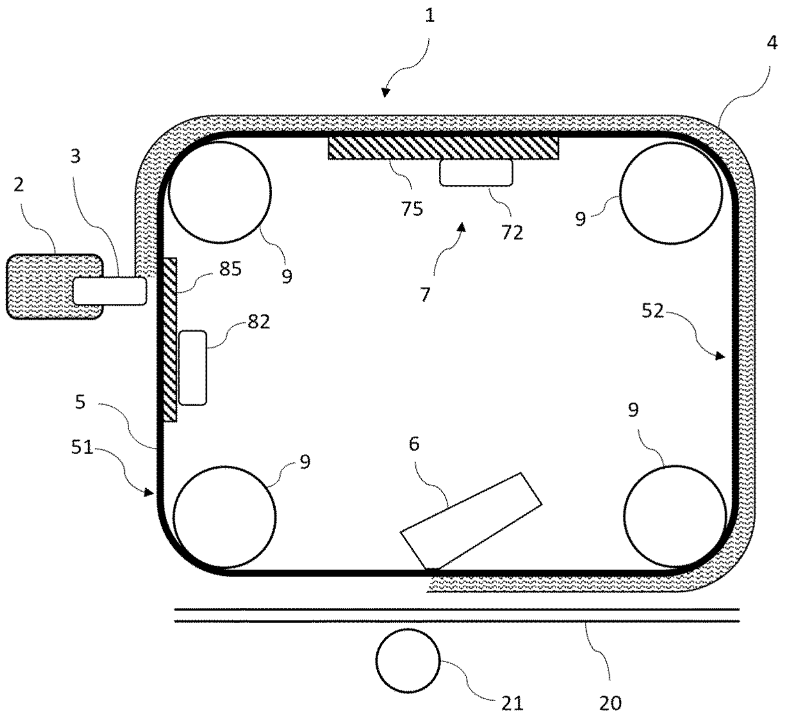
FIG. 1 is a schematic representation of a printing apparatus according to an embodiment of the invention comprising a cooler and a heater.

The apparatus comprises a conveyor system, a printhead 6 and a coater 3. The apparatus may also comprise an endless ribbon 5 or is designed to receive an endless ribbon 5. FIG. 1 shows a schematic picture of a thermal transfer printing apparatus according to one embodiment of the present invention.

Coater

The printing apparatus 1 comprises a coater 3. The coater 3 is designed and arranged to coat an outer face 51 of the ribbon 5 with ink 4.

As illustrated in FIG. 1, the coater 3 is connected to a reservoir 2. The reservoir is designed to comprise solid ink to feed the coater 3. In one another embodiment, the reservoir may comprise liquid ink and it may be coupled with a mixing element in order to keep ink in predefined physical conditions, for example in temperature and/or viscosity.

The coater 3 may be positioned in contact with or in the vicinity of the ribbon 5 to facilitate the coating of the outer face 51 of the ribbon 5.

The coater 3 is designed to apply a layer of liquid ink 4 on the outer face of the ribbon 5. The layer of liquid ink 4 is preferably distributed homogeneously on the surface of the ribbon 5. An ink control component (not represented) may ensure the distribution of a sufficient quantity of ink on the surface of the ribbon 5 in function of the speed of rotation/displacement of the ribbon 5 and/or the printing mode.

One objective of the ink control component is to ensure a quasi-constant coating thickness on the ribbon 5 whatever the displacement speed of the ribbon 5. In one embodiment, the ink control component comprises an electrical input for reading the displacement speed of the ribbon 5. In that way the ink control component may ensure constant coatings and a homogeneous distribution in a lap of time at variable speeds. In such configuration the printing and coating sequence are synchronized.

In a first example non-illustrated, the coater 3 comprises a canal comprising liquid ink such as a slot-die coating device. A first extremity of the canal is connected to a reservoir 2. The second extremity of the canal forms the coater head. The output of the coater head is adjacent, most preferably perpendicular to the outer face of the ribbon 5. Said canal may also comprise a tapering or parallel slit. By gravity and capillarity, the liquid ink is conveyed to the second extremity of the canal and is coated on the outer face of the ribbon 5. In this example, the axis of the coating head may be parallel to the axis through which the ink is projected from the coater 3. This axis is preferably perpendicular to the main axis of the adjacent part of the ribbon 5 or perpendicular to the surface of the ribbon 5.

In a second example non-illustrated, the coater 3 comprises a device to transport liquid ink from the reservoir 2 to the ribbon 5. Said device may comprise an ink roller that resides at least partially within the reservoir 2 and that is adjacent to or in contact with the outer face of the ribbon 5. The ink roller, by rotation, transports the liquid ink from the reservoir 2 to the outer face of the ribbon 5. Said device may also comprise a material located at least partially in the reservoir 2 and adjacent to or in contact with the ribbon 5 and capable of transporting the ink to the ribbon 5 by capillary action. Said material may comprise a foam or a sponge material or any material capable of improving such capillarity effect.

The coater 3 could also be chosen among the traditional list of coating techniques. In some other non-illustrated examples, the coater 3 is designed to apply ink to the endless ribbon using any technique available to the skilled person such as but not limited to knife-coating, curtain coating, extrusion coating, slot die, transfer coating, flexo coating, screen printing or a combination of such techniques.

The coater 3 could be chosen among the traditional list of printing techniques in roll to roll or sheet to sheet or roll to sheet. Printing techniques may encompass methods using heliogravure, serigraphy, flexography, inkjet or offset resulting in the application of thin, homogeneous, and controlled thickness of ink onto the endless ribbon. The amount of ink applied to the ribbon is dependent on the technique used, the temperature of the ink during coating and its features.

In both examples, the reservoir 2 and/or the coater 3 comprise(s) a heating device to melt the ink in respectively the reservoir 2 and/or the coater 3. The reservoir 2 can be filled with solid ink. The contact of the solid ink with the reservoir 2 or with the coater 3 will readily melt the ink.

In one embodiment, the printing apparatus 1 includes a device that periodically adds new solid ink in the reservoir 2.

Ink

The ink used is preferably a thermoplastic composition, subjected to melting upon temperature above its melting point. It is understood thermoplastic means meltable or thermally fusible and encompasses any material, characterized by a melting point or a melting temperature. Here the terms hot melted ink or ink refer as to any composition of thermoplastic ink used in a thermal printer, characterized by its melting point. During the process described here, the ink is molten to the proper consistency or viscosity to be applied onto an endless ribbon. The ink could also use materials that are extremely viscous at room temperature and free of tack upon cooling.

The coating device may comprise means to melt the ink using any technique available to the skilled person such as be not limited to direct or indirect convection heating, induction heating, or conduction heating. In one example, the coating device comprises a thermal resistance to melt the ink.

In a preferred embodiment, the ink composition contains at least a colorant or a pigment, optionally contains natural wax, optionally contains synthetic resin or a combination of the two. The ink composition optionally contains surfactants, optionally contains organic and/or inorganic fillers, and optionally contains solvents. Other various surfactants and other flow aids may also be used.

The ink is characterized by the fact it is solid at ambient temperature and a liquid at temperatures above ambient temperature. During printing, the ink is typically heated until it becomes a liquid. The transfer of ink from the ribbon to the printing substrate is therefore ensured thanks to the ability of the ink to rapidly change phases from solid to liquid during printing, in the vicinity of the printhead, and from liquid to solid once the ink is applied to the substrate, whereby an image could be turned to form. The ink may start to solidify at room temperature.

Preferably, the melting point of the ink ranges from 50° C. to 100° C.

Printhead

The printing apparatus 1 comprises a printhead 6. In one preferred embodiment, the printhead 6 is a thermal transfer printhead 6.

In one embodiment, the printhead has two configurations.

In a first configuration, the printhead 6 is in contact with the inner face of the ribbon 5 in order to enable the thermal transfer 6 of the ink located in the outer face 51 of the ribbon 5. During this printing process, the outer face 51 of the ribbon 5 is in contact with a substrate 20 in order to transfer part of ink intended for printing the substrate.

In a second configuration, the printhead 6 is not in contact with the ribbon 5. This mode may be engaged when the printing apparatus is switched off or during two successive printing sequences. The alternance of the first and second mode may be configured depending on the printing mode.

A print roller 21 can be used to transport a substrate 20 proximate to the ribbon 5. The thermal transfer printhead 6 is preferably in the vicinity of the substrate 20 and is used to transfer hot melt ink 4 from the ribbon 5 to the substrate 20. The arrangement between the printhead 6, the ribbon 5 and the substrate 20 may be ensured by mechanical components which are precisely set according to a desired printing precision. Some guides and position control components may be implemented in order to ensure a predefined arrangement between at least the printhead 6 and the ribbon 5.

The print roller 21 ensures a sufficient pressure on the substrate 20 in order to maintain the substrate 20 in contact with the ribbon 5 when the printing process is engaged. In this configuration, said ribbon 5 is maintained in a moving sandwich layer between the substrate 20 and the printhead 6 during the printing process. The movement of the substrate is in the same direction as the displacement direction of the ribbon 5 in the vicinity of the printhead. This movement in the vicinity of the printhead is preferably a rectilinear movement.

In an alternative embodiment, the printhead comprises a laser to heat the ink through the thickness of the ribbon 5 in order to enable the thermal transfer of the ink located on the outer face 51 of the ribbon 5. Preferably, the wavelength of the laser is comprised between 950 nm and 1450 nm.

Ribbon

The ribbon 5 of the printing apparatus 1 allows the transport of the ink 4 from the coater 3 to the printhead 6 on its outer face 51. The ribbon 5 preferably forms a loop. In such configuration, the residual ink, not used during the printing process, is conveyed past the printhead to an ink recovery device (non-illustrated). In consequence, the same ribbon 5 is used continuously for conveying ink for printing and for conveying residual ink after the printing, preferably in a cyclic manner. The printing process is implemented such to form a continuous looping process where residual ink is retrieved automatically. This configuration allows retrieving ink which has not been printed. This ink may be advantageously reused on the next turn of the ribbon 5.

In other words, the ribbon 5 is conveyed along a path comprising a first path from the coater 3 to the printhead 6 and a second path from the printhead 6 to the coater 3, in a continuous looping process, i.e., in a cyclic manner. On its first path, the ribbon 5 supports the freshly coated ink. On its second path, the ribbon 5 supports and transports part of the ink which has not been printed by the printhead 6.

One advantage of the invention is to provide and autonomous printing apparatus where at least a part, preferably 100% or substantially 100% of the ink is used, i.e., without ink loss.

The ribbon 5 can be made of various materials. The ribbon 5 is preferably made of a material with high temperature resistance properties, such as temperature resistance up to 300° C., and high chemical resistance properties, for example a chemical resistance to alcohol, ink or solvents, etc. Preferably, the ribbon 5 is made of polyimide. The polyimide allows the ribbon to be used at temperatures up to the range [340°-380°] of temperatures without undergoing deformation. In a preferred embodiment, the ribbon 5 may also be made of metal or metal alloy. The ribbon may be made of metal alloy such as stainless steel, Aluminum alloy, Titanium alloy, Copper alloy, Beryllium alloy. In one embodiment, the ribbon may comprise an alloy comprising Nickel, Tin and Copper, preferably between 14.5% m and 15.5% m of Nickel, between 7.5% m and 8.5% m of Tin, and between 75% m and 79% m of Copper.

The ribbon 5 is preferably made of a material that has a heat transfer rate greater than 0.120 Watts/meter-Kelvin.

The thickness and the composition of the ribbon material is designed to create heat transfer through the ribbon allowing the printing.

Preferably, the thickness of the ribbon is inferior to 50 μm or to 20 μm. Said thickness advantageously allows low heat transfer resistance between its inner face and outer face, improving the quality of printing. The thickness of the ribbon 5 may be comprised between substantially 0.5 μm and 50 μm, most preferably between 0.5 μm and 20 μm. In one example, the thickness of the ribbon 5 is chosen in the range [3-25 μm] or [5-10 μm].

In one embodiment where the printhead 6 comprises a laser, the ribbon 5 is transparent in the wavelength of said laser. In said embodiment, the thickness of the ribbon 5 is chosen in the range [3-200 μm].

Cooler

According to the invention, the printing apparatus 1 comprises at least one cooler 72. The cooler 72 is configured to cool the coated ink 4 on the endless ribbon 5 in the first portion of the path of said ribbon 5. Said first portion is preferably arranged along a portion of the first path of the ribbon 5, from the coater 3 to the printhead 6. The cooler 72 advantageously improves the solidification of the melted ink 4 after the coating. The ink 4 near the printhead 6 advantageously regains its solid state thanks to the cooler 72, improving the quality of printing by thermal transfer. Indeed, the printhead 6 melts a portion of the ink 4 to be printing on the substrate 20, the cooling of the ink 4 at a predefined temperature before arriving proximate to the printhead improves the precision of the printing.

The cooler 72 is preferably configured to cool down the ink 4 at a predefined temperature. Preferably, the cooler is designed to cool down the ink on the ribbon at a temperature lower than the melting temperature of said ink.

The cooler 72 may be an active cooler. An active cooler comprises means fed by alimentation to produce cool. An active cooler does not comprise an ordinary fan used to extract the heat outside of the system. Such fan merely transports the heat by convection but does not produce cold and will not produce the wished effect of cooling the ink at a predefined temperature. The cooler 72 may be arranged to cool the ink 4 through the ribbon 5.

In a first embodiment, the cooler 72 comprises at least one thermoelectric material, preferably a thermoelectric material showing a Peltier effect. A thermoelectric material showing a Peltier effect produces a heat flow from an electric current. When a current is made to flow through a junction between two conductors, heat is removed at one junction. The cooler 72 may comprise a Peltier heat pump. A Peltier heat pump comprises multiple junctions in series, through with a current is driven. Some of the junctions lose heat due to the Peltier effect, while others gain heat. The Peltier heat pump is designed in a way that the junctions losing heat are arranged to cool down the ink in the ribbon, preferably through the ribbon.

In a second embodiment, the cooler 72 comprises a heat exchanger arranged to cool down the ink in the ribbon, preferably through the ribbon. The heat exchanger may comprise a circulating fluid (also called a coolant) through radiator coils and air flows past the coils, which cools the coolant and heats the incoming air. The coolant cooled by the radiator is driven to cool down the ink, preferably through the ribbon. The heat exchanger may comprise a fan to improve airflow in contact with the radiator to cool the coolant.

The first and the second embodiment may be combined to cool down the ink 4 on the ribbon 5, preferably through the ribbon 5.

Heater

According to one embodiment, the printing apparatus comprises at least one first heater 82. The first heater 82 is configured to heat the ink on the ribbon along a second portion of the path of the ribbon 5. The second portion extends on at least a portion of the second the path of the ribbon. The heater 82 advantageously causes the remaining ink 4 after printing to melt or to come closer of its melting point on the ribbon 5. The first heater 82 advantageously improves the coating and the replacement of the ink 4 on the ribbon by the coater 3. Preferably, the first heater 82 is configured to heat the ink on the ribbon on the second portion at or above a second predefined temperature.

In one embodiment, the first heater 82 is also configured to heat the ink on the ribbon along a third portion of the path of the ribbon 5. In an alternative embodiment, the printing apparatus comprises a second heater 84 configured to heat the ink on the ribbon along a third portion of the path of the ribbon 5. The third portion preferably includes a coating zone wherein the ribbon 5 is coated with ink by the coater 3.

In one embodiment, the third portion extends at least along 2 cm on each part of the coating zone. Preferably, said third portion extends along a length inferior to 10 cm.

Preferably, the first heater 82 and/or the second heater 84 is configured to heat the ink on the ribbon on the third portion above a third predefined temperature. In one embodiment, the second and the third predefined temperature are equal. Preferably, the third predefined temperature is higher than the second predefined temperature. The third predefined temperature is preferably higher than the melting point of the ink.

In this embodiment, the heating of this third portion advantageously flows ink 4 to improve the homogeneity of the thickness of the ink on the band before the cooling of said ink. In one embodiment illustrated on the FIGS. 1 and 2, the first or the second heater is arranged to heat the ink on the ribbon on a portion extending from both the sides of the coater. One advantage is to heat the ink 4 on the ribbon before, during, and after coating to improve the coating and the uniformity of the thickness along the width and the length of the ribbon 5. The heater 82 may comprise several means, each configured to heat the ink on the second or on the third portion.

The heaters 82, 84 may comprise resistance to heat the ink 4 through the ribbon 5 by Joule heating. In another embodiment, the heater comprises heating means by radiation to heat the ink on the ribbon 5.

In said embodiment, the ink on the ribbon 5 is firstly heated before arriving on the coater (and optionally after the coater) and is secondly cooled down by the cooler before the step of printing to provide solid ink and improve the quality of printing.

In one embodiment, the second and the third portion are adjacent.

Conveyor System

The ribbon 5 is held and transported using a conveyer system. The conveyor system supports and transports the ribbon 5 along a path from the coater to the printhead in a cyclic manner. The conveyor system supports and transports the endless ribbon along the first the path from the coater to the printhead and along the second path from the printhead to the coater.

As illustrated in FIG. 1, the conveyor system may comprise at least one roller 9 to hold and transport the endless ribbon 5. The conveyor system may comprise a plurality of roller 9 holding and transporting the endless ribbon along its path.

Said rollers 9 have a cylindrical shape. Said rollers are joined to the frame 12 with at least 1 degree of freedom in rotation along an axis which is the longitudinal axis of the cylinder of said roller. Preferably, the rollers 9 are mechanically connected to the frame in such a way that the longitudinal axis of said rollers is sensibly perpendicular to the surface of the frame in contact with said roller 9. In one embodiment, at least one roller 9 is joined to the frame with at least one degree of freedom in translation. Preferably, said at least one roller 9 is free in translation in regard with the frame along a plane sensibly perpendicular to the longitudinal axis of the cylinder of said roller.

At least one of the rollers 9 may be a drive roller. The drive roller is connected to a motor to rotate said drive roller. At least one battery or an electrical alimentation may be implemented in the printing apparatus in order to provide power supply to the motor. The rotation of the drive roller generates the displacement of the endless ribbon 5 along its path which also generates the rotation of the other rollers.

First Embodiment: Cooling Roller

Figure 7:
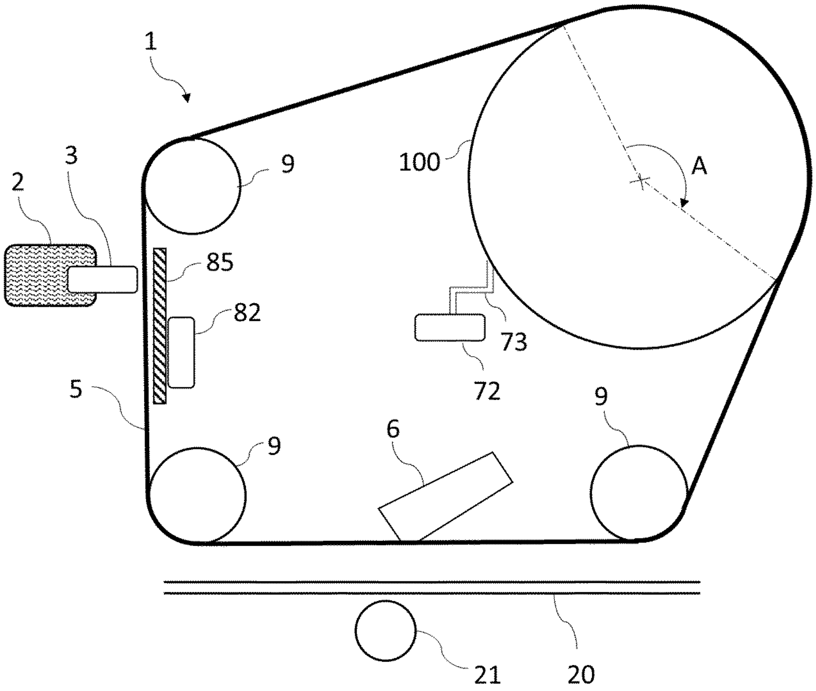
FIG. 7 is a schematic representation of a printing apparatus according to another embodiment of the invention comprising a cooling roller.
Figure 8:
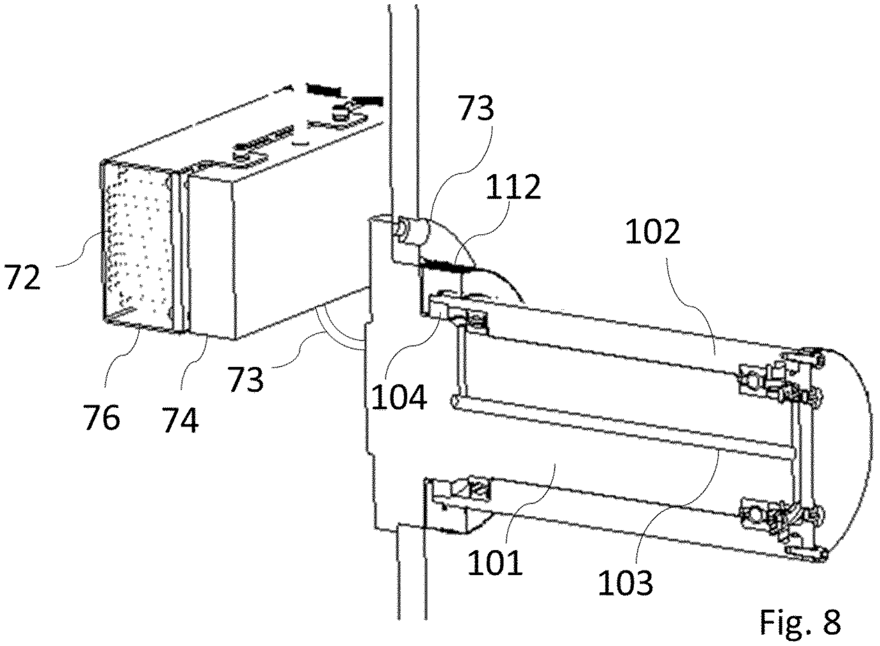
FIG. 8 is a cross-sectional view of a cooling roller according to one embodiment of the invention.
Figure 9:
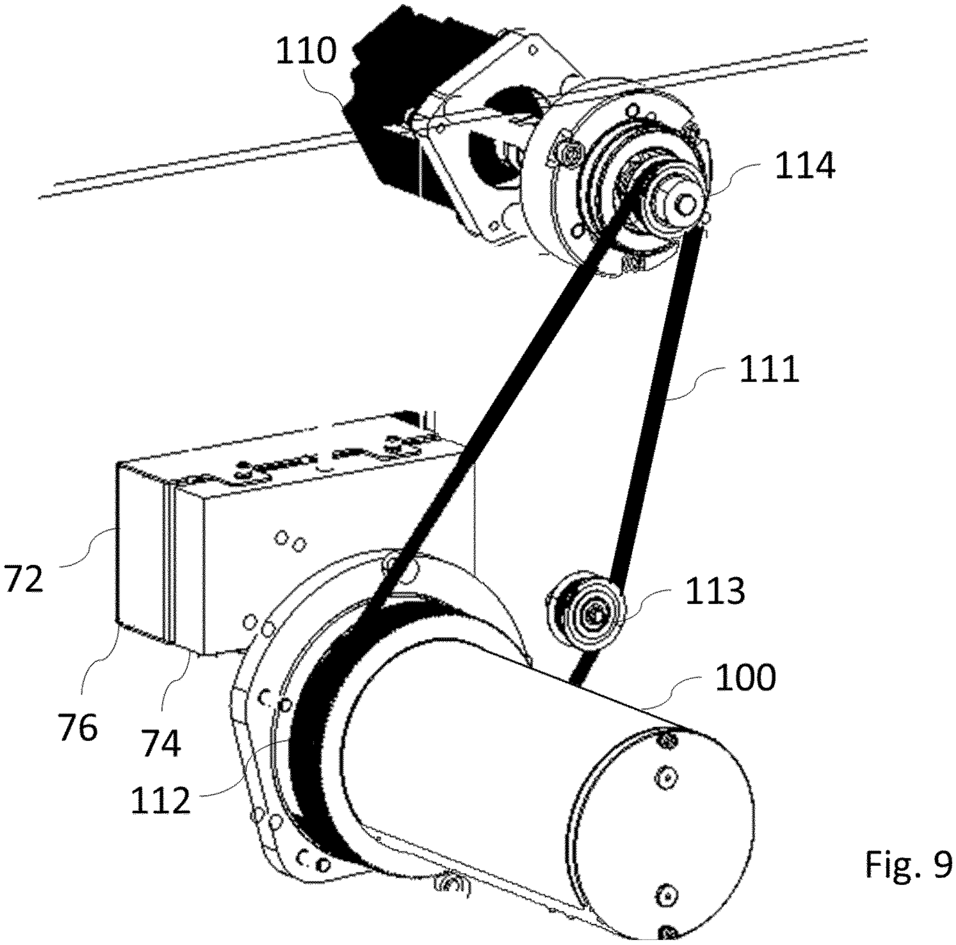
FIG. 9 is a schematic representation of a cooling roller according to one embodiment of the invention coupled to a motor to drive the rotation of said cooling roller.

In a first embodiment illustrated in FIGS. 7, 8 and 9, the cooler 82 is arranged to cool down at least one roller 100, preferably a roller 100 arranged on the first portion. For example, the thermoelectric material can be integrated in or in contact with one roller 100 supporting the ribbon 5 in the first path of the ribbon 5. The roller 100 is then cooled down causing the cooling of the ink 4 through the ribbon 5 on the first portion of its path. In another example, the heat exchanger is designed in such a way that the coolant is guided to cool the roller 100. The roller 100 is preferably made of a material comprising a high thermal conductivity. The roller 100 may be made of metal such as Aluminum or Copper or an alloy of such metals. One advantage is to improve the thermal transfer from the coolant to the roller and from the roller to the ribbon.

The cooling roller 100 is arranged to be in contact and to support the inner face 52 of the ribbon 5. In one embodiment, the cooling roller is designed and arranged to support the ribbon 5 by its inner face 52 along an angle A superior to 100°, preferably superior to 120°. This angle may be adjusted by modifying the position and the/or the diameter of the 2 adjacent rollers 9 on both sides of the cooling rollers. In one embodiment, the diameter of the section of the cooling roller is superior to 50 mm, preferably superior to 70 mm.

This angle A combined to the diameter of the cooling roller 100 advantageously allow a longer contact area between the cooling roller 100 and the ribbon 5, improving the cooling and the solidification of the coated layer of ink 4 on the ribbon.

One advantage of using a cooling roller 100 rather than a static plate 75 as described before is that the ribbon is not sliding along the roller. The roller may be driven in rotation by a motor or by the ribbon itself by gripping the circumferential surface of the cooling roller and the ribbon.

The cooling roller 100 is preferably connected to a cooler 72 comprising a heat exchanger as described below for the guiding element.

An embodiment of such cooling roller is now described in reference to FIG. 8 and FIG. 9.

The cooling roller 100 comprises a shaft 101. The shaft is made of a high thermal conductor material such as a metal (e.g., aluminum alloy).

The shaft 101 comprises at least one pipe 103. The pipe 103 extends along the volume of the shaft and is fluidly connected to the coils 73 of the heat exchanger. The coolant is then cooled by the radiators 76 and reinjected into the pipe 103 of the shaft 101 to cool down the shaft 101. In one embodiment, the diameter of the pipe 103 ranges from 5 to 20 mm. In one embodiment, the length of the pipe 103 ranges from 150 to 400 mm.

The cooling roller 100 also comprises a rotor 102 free in rotation around the shaft 101. The outer surface of the rotor is supporting the ribbon 5.

The cavities between the shaft 101 and the rotor 102 is preferably filled with a lubricant such as silicone oil. One advantage is to reduce friction between the shaft 101 and the rotor 102. Another advantage is to improve thermal conduction between the shaft 101 and the rotor 102.

In one embodiment, the cooling roller 100 comprises a sealing ring 104 between the shaft 101 and the rotor 102 to avoid leaks of lubricant in the cavities during rotation of the rotor 102.

In one embodiment, the printer further comprises a motor 110. The motor 110 is arranged and designed to drive the rotation of the rotor 102 of the cooling roller 100.

The motor may be connected to a controller. In one embodiment, the controller is configured to control the speed of rotation of the motor 110 in function of the speed of rotation of the drive roller described before.

In one embodiment illustrated in FIG. 9, the motor 110 comprises a driving pulley 114 and the rotor 102 of the cooler 100 comprises a driven pulley 112. The printer further comprises a belt 111 to transmit the rotation of the driving pulley 114 to the driven pulley 112, and therefore, to the rotor 102 of the cooler. In one embodiment, the system further comprises a tensioner 113 arranged to ensure a tension of the belt and to increase the angle of contact between the belt 111 and the driving pulley 114 and/or the driven pulley 112.

Second Embodiment: Cooling plate

Figure 11:
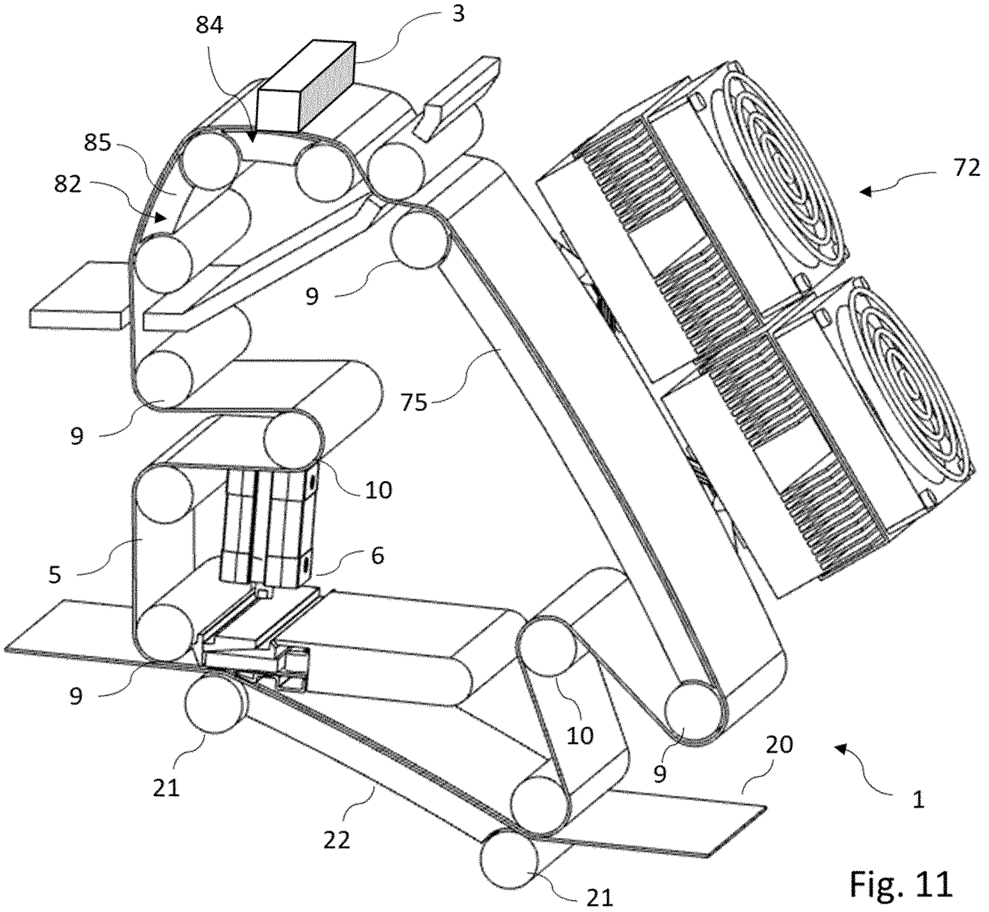
FIG. 11 is a perspective view of a printing apparatus according to one embodiment of the invention wherein the frame of the printing apparatus has been removed and comprising a cooling plate in direct contact with the ribbon.

In a second embodiment illustrated in FIG. 1 and in FIG. 11, the conveyor comprises a first guiding element. The first guiding element may comprise a static support element, preferably arranged between two adjacent rollers 9. Said static support element is preferably a plate, such as a metal plate or a metal sheet. The ribbon 5 is sliding on the first guiding element 75 (e.g., the metal plate) along its length. In the below description, the term "plate"will be used to design the first guiding element 75. A plate comprises preferably an element comprising a volume for which the third dimension is at least 5 times lower than the second or the first dimension. A plate may also comprise a segment.

One portion of the plate is arranged to be in contact with the inner side of the ribbon 5 to cool down the ink through said ribbon. The metal plate is preferably made of aluminum or an aluminum alloy to improve thermal conduction.

Preferably, the plate is a static support element regarding the frame 12. Preferably, the plate is mechanically connected to the frame with 0 degree of freedom. The plate and the frame are completely joined together. This connection is sometimes referred to as an interlocking connection. In other words, the frame 12 and the plate have no possible relative movement one to each other. This connection between the frame 12 and the plate 75 can be direct (e.g., by direct contact) or can be indirect (for example, both the plate 75 and the frame are completely joined to an intermediary or ancillary element).

In one embodiment, the first guiding element comprises a lubricant between the plate 75 and the ribbon 5 to improve the sliding of the ribbon on the plate. In one embodiment, said lubricant may comprise liquid oil. The liquid oil advantageously allows lubrication and the electrostatic discharge from the ribbon or from the plate towards the frame for earthing.

Figure 6:
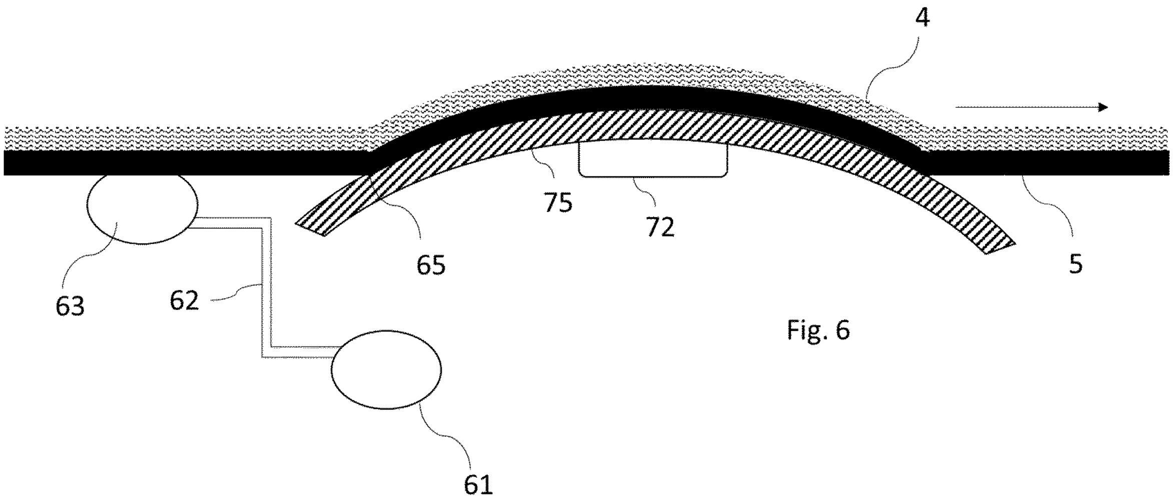
FIG. 6 is a schematic representation of a part of the printing apparatus according to one embodiment of the invention wherein the cooler comprises a curved static plate arranged to be in contact with the inner face of the ribbon and further comprise means to coat the inner face of the ribbon with a lubricant before the ribbon slides along the plate.

In one embodiment illustrated in FIG. 6, the cooler comprises an absorbent material 63. The absorbent material 63 is designed to retain or absorb oil or other lubricant thereon. The absorbent material 63 is arranged to be in contact with the inner face 52 of the ribbon 5, preferably between the coater and the plate 75. The absorbent material 63 is intended to be soaked with lubricants. For this purpose, the printer further comprises a reservoir 61 intended to be filled with lubricants (such as liquid oil) and means to transport said lubricant from the reservoir 61 to the absorbent material 63. Said means may comprise pipes 62 fluidly connecting the reservoir 61 to the absorbent material 63. The absorbent material 63 is preferably fixed in translation with the frame.

In one example, the absorbent material comprises a spongy material, a fabric, or a cotton. Said absorbent material is therefore able to feed lubricant on the inner face of the ribbon before sliding on the plate. One advantage is to reduce damages made to the ribbon during the sliding because of the friction between the ribbon and the plate. Therefore, the time-of-life of the ribbon is improved.

The first guiding element 75 is arranged for guiding the moving ribbon 5 along a predefined path, for example a curved path. The first guiding element 75 is a rounded shape guide supporting the ribbon 5.

A first advantage of a rounded shape or curved shape of the plate is to reduce the friction forces causes to the ribbon at the point of contact between the ribbon 5 and the plate 75. Indeed, this shape ensures that the ribbon will not rub against an edge of the plate. A second advantage is that the curved shape further ensures the contact between the ribbon and the plate and reduces the risk of air bubbles insertion between the ribbon and the plate. Therefore, the thermal conduction between the ribbon and the plate is advantageously improved.

For this purpose, the plate 75 has an outer face, intended to support the inner face of the ribbon, which is convex.

In one embodiment, the radius of curvature of the convex surface is to higher than 2 cm.

In one embodiment, the length of the first surface of the plate 75 is ranging between 2 cm and 20 cm.

In one embodiment, the first guiding element 75 (e.g., the plate) is coupled with the cooler 72 in order to cool the coated ink 4 on the ribbon 5 supported by the first guiding element 75. As described above, the first guiding element 75 may be cooled by a thermoelectric material. The junction losing heat of the thermoelectric material may be in contact with one face of the guide, preferably the face opposed to the face in contact with the ribbon 5. In another embodiment, the coolant of the heat exchanger is driven through the first guiding element 75 to cool it down. In one embodiment, the first guiding element comprises a core having a cavity wherein a coolant is circulating in order to cool an outer face of the core, said outer face being arranged to support the ribbon 5. The first guiding element 75 is then arranged to cool down the part of the ribbon 5 supported by said first guiding element 75, preferably along the first portion of the path of said ribbon 5. The cooler 72 may comprise a Peltier element.

One advantage of the first guiding element 75 is to take advantage of the surface of contact between the first guiding element 75 and the ribbon 5 to cool the ink on the ribbon. The ink 4 is cooled by the first guiding element 75 through the ribbon.

In one embodiment illustrated in FIG. 1, the conveyor system may comprise a second guiding element 85 arranged for guiding the moving ribbon along a predefined path in the same manner as described for the first guiding element 75. The second guiding element 85 may be coupled with the first heater 82 and/or the second heater 84 in order to heat the ink 4 on the ribbon supported by the second guiding element 85. The second guiding element is arranged to hold and support the ribbon along the second portion of the path of the ribbon 5 and/or along the third portion of the path of the ribbon. Preferably, as illustrated in FIG. 1, the second guiding element 85 is arranged to be in contact with the ribbon 5 on a portion extending from both sides of the coater 3. An electrical resistance may be integrated inside said second guide to heat the ink 4 through the ribbon 5 and through the walls of the second guiding element 85.

One advantage of the cooling plate in direct contact with the ribbon is that such configuration allows to reduce the volume of the printing apparatus compared to a cooling roller. Indeed, a cooling roller, to cool down the ink as much as the plate, would require an important diameter leading to an increase of the overall printing apparatus volume. Even if the length of the path of the ribbon is reduced using a cooling roller rather than a cooling plate, the roller's encumbrance would be larger than the one of the plate.

In one embodiment, the plate 75 is removable from the frame 12. The plate 75 may also be partially disassembled from the frame 12, e.g., to facilitate the positioning of the ribbon along its path.

Third Embodiment: Cooling Conveyor Belt

Figure 2:
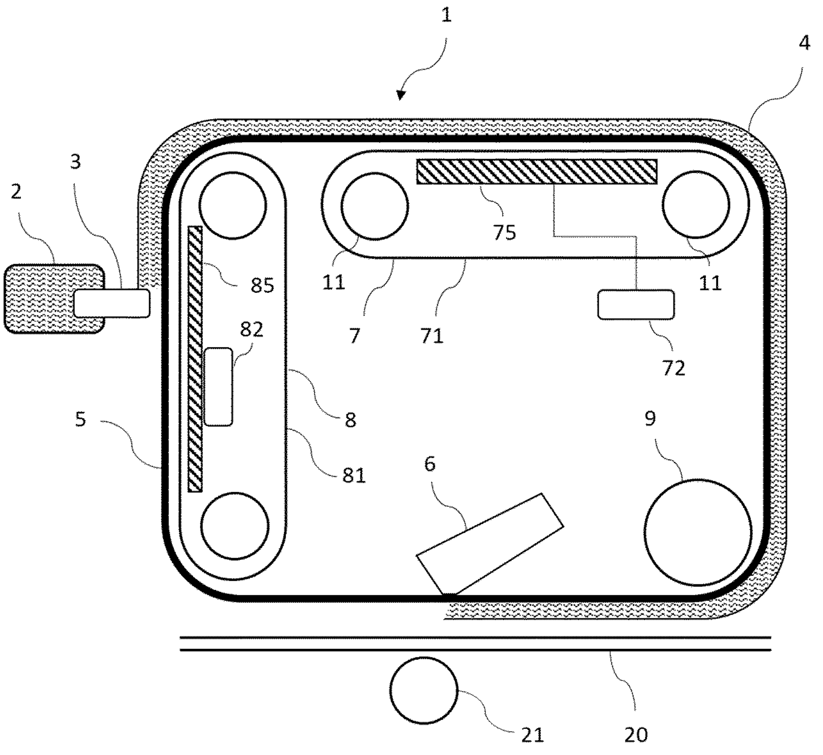
FIG. 2 is a schematic representation of a printing apparatus according to an embodiment of the invention wherein the cooler and the heater are integrated in conveyors comprising conveyor belts.

In an alternative embodiment illustrated in FIG. 2, the conveyor system comprises at least one first conveyor 7 comprising a conveyor belt 71.

The conveyor belt 71 is designed and arranged to hold and transport the ribbon 5 by its inner face along at least the first portion of the path of the ribbon. The first conveyor belt 71 fulfills the same function as a continuous track driving the ribbon 5 in one direction of rotation. In one embodiment, the conveyor belt 71 comprises a parallelogram form that is looped in order to form a ribbon support.

The inner face of the ribbon 5 is held on the outer face of the conveyor belt 71. In the example of FIG. 2, the conveyor belt 71 is supported by at least two rollers 11. In another example, the conveyor belt 71 is supported by three rollers 11, for example to form a triangle or a prism.

The conveyor belt 71 supports a portion of the ribbon 5 during its movement, reducing the tension along the ribbon 5. This supporting function of the conveyor belt 71 aims to offer better distribution of the tensions that apply on the ribbon 5.

By "portion of the ribbon" it should be understood part of the ribbon on a portion of the path of the ribbon.

One advantage of the conveyor belt 71 is that the ribbon 5 is carried along a distance between two rollers 11 without undergoing mechanical deformations.

In a preferred embodiment, the ribbon 5 is carried along said distance on a rounded surface of the conveyor belt 71. Indeed, a rounded to surface, comprising a maximal radius of curvature allows reducing friction between the belt and the ribbon and further allows reducing the perpendicular force applied to the ribbon. In such configuration, the rounded surface of the conveyor may be designed so that maximizing the radius of curvature of the ribbon 5.

The conveyor 7 advantageously minimizes the stress on the ribbon which improves the time of life of said ribbon 5. Furthermore, minimizing stress on the ribbon 5 allows to avoid the creation of a ripple profile on the ribbon 5. Moreover, the use of a conveyor belt 71 reduces the risk of wrinkling and of misalignment of the ribbon 5.

The conveyor belt 71 may comprise a plastic band arranged around at least two rollers 11. In other embodiments, the conveyor belt 71 may be made in any flexible material such as an elastomer, a thermosetting resin or a thermosetting plastic such as polyimide, a cork band or a sheet of metal, such as stainless steel.

These rollers 11 carry the conveyor belt 71 around a path comprising a portion wherein the conveyor belt 71 carries the ribbon 5 along a portion of the path of the ribbon 5.

In one embodiment the first conveyor 7 comprising the first conveyor belt 71 is coupled with the cooler 72. The first conveyor belt 71 holds and supports the ribbon on the first portion of the path of the ribbon. In one embodiment, the rollers 11 of the first conveyor 7 are coupled with the cooler 72.

In another embodiment, the first conveyor 7 comprises a first guiding element 75. The first guiding element 75 guides the moving conveyor belt along a predefined path in the same manner as the first guiding element of FIG. 1 guides the ribbon 5. In particular, the portion of the first conveyor belt 71 carrying the ribbon 5 is supported by the first guiding element 75. The first guiding element 75 may be a partially rounded shape guiding element.

The first guiding element may comprise a plate as described in the first embodiment, wherein the convex surface of said plate supports indirectly the ribbon 5 dragged by the conveyor belt 71.

Said first guiding element 75 may be preferably coupled with the cooler 72 in order to cool the coated ink 4 through the first conveyor belt 71 and through the ribbon 5. In this embodiment, the first conveyor belt 1 is preferably made with a material having high thermal conductivity such as metal, preferably Aluminum or Copper or an alloy of such metals. Said first guiding element 75 could be coupled with the cooler in a similar way as described above in the description of the first guiding element of FIG. 1.

In the same manner, the conveyor system may comprise a second conveyor 8 comprising a second conveyor belt 81. The second conveyor belt 81 holds and transport the ribbon 5 on at least the second portion of the path of the ribbon 5 and/or the third portion of the path of the ribbon 5. The second conveyor belt 81 may comprise a second guiding element 85 coupled with the heater 82. The second guiding element 85 may be arranged in a way to heat the ink 4 on the ribbon 5 on the second portion of the path of the ribbon 5. The rollers of the second conveyor 8 may also be coupled with the heater 82 in the same manner that the rollers 11 of the first conveyor 7 are coupled with the cooler 72. The heater 82 may comprise at least one resistance arranged to heat by Joule heating the conveyor belt 81. At least one resistance may be arranged inside or in contact with the rollers of the second conveyor 8 or the second guiding element 85.

In one embodiment, the second portion and the third portion are adjacent and the heater 82, 84 is configured to heat the ink on the ribbon along a section comprising the point wherein the ribbon is coated by the coater 3.

In one embodiment, the first heater 82 and/or the second heater 84 is coupled with rollers 9 of the conveyor system and/or with rollers 11 supporting the conveyor belt 71.

Figure 3:
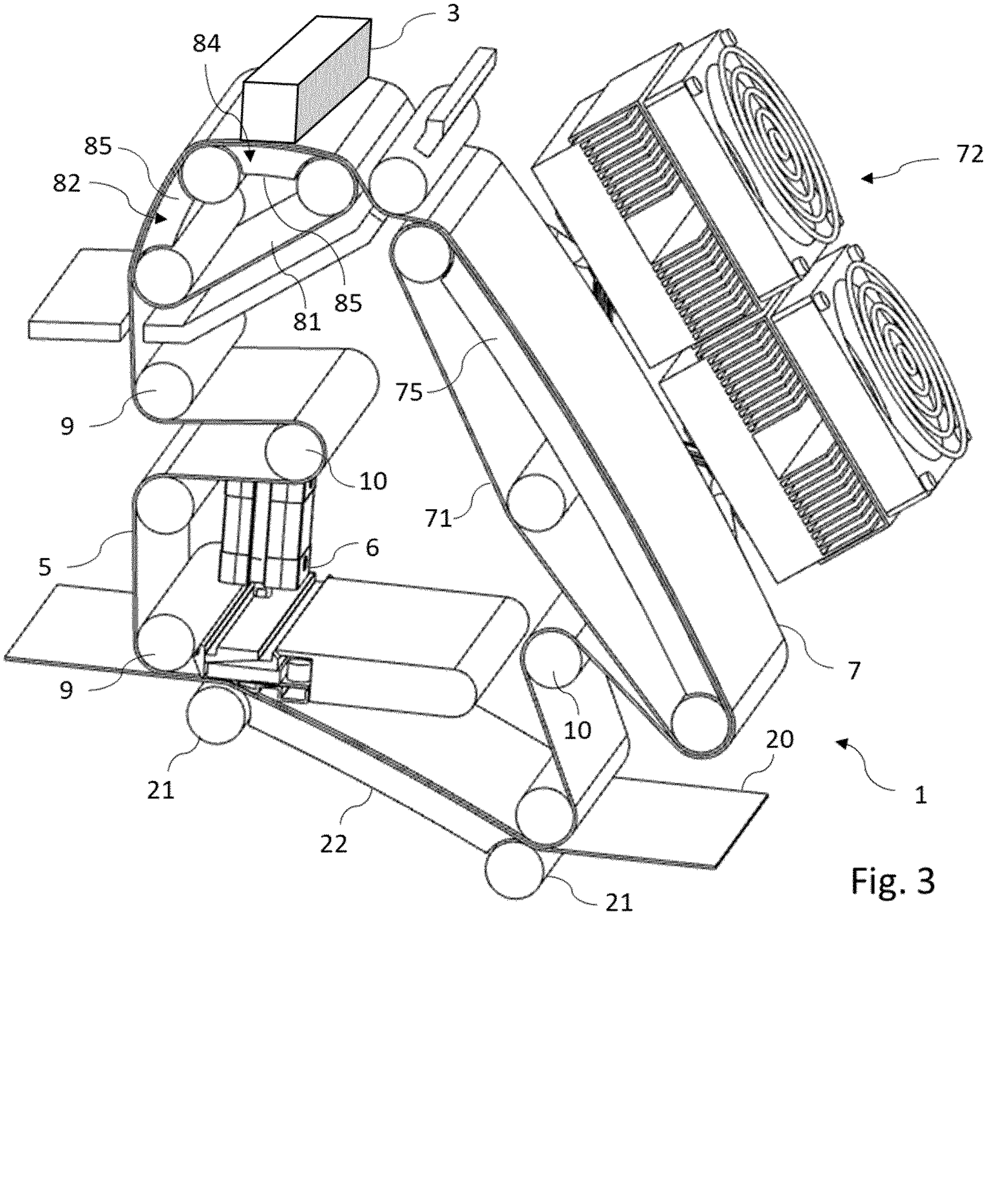
FIG. 3 is a perspective view of a printing apparatus according to one embodiment of the invention wherein the frame of the printing apparatus has been removed.
Figure 4:
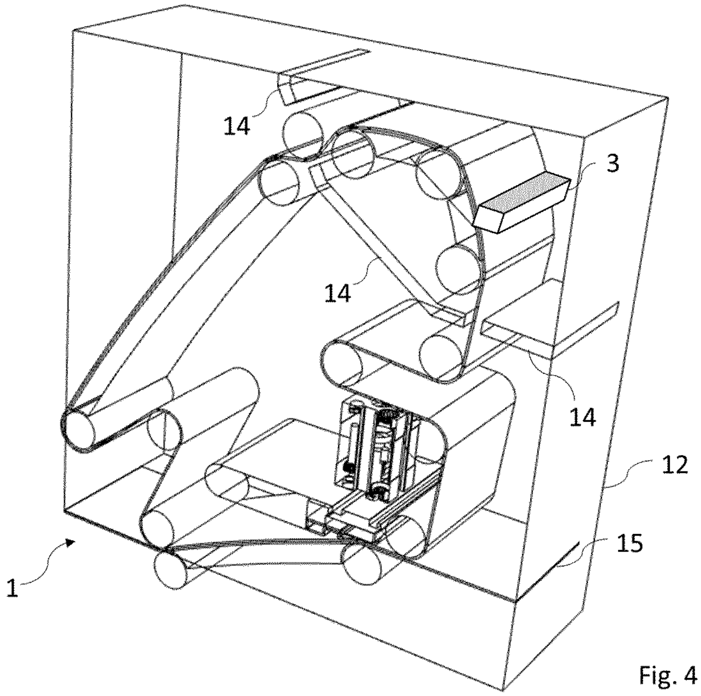
FIG. 4 is a cutting plan of the printing apparatus of FIG. 3 wherein the printing apparatus comprises isolating walls to isolate the heater and the coater from the cooler.
Figure 5:
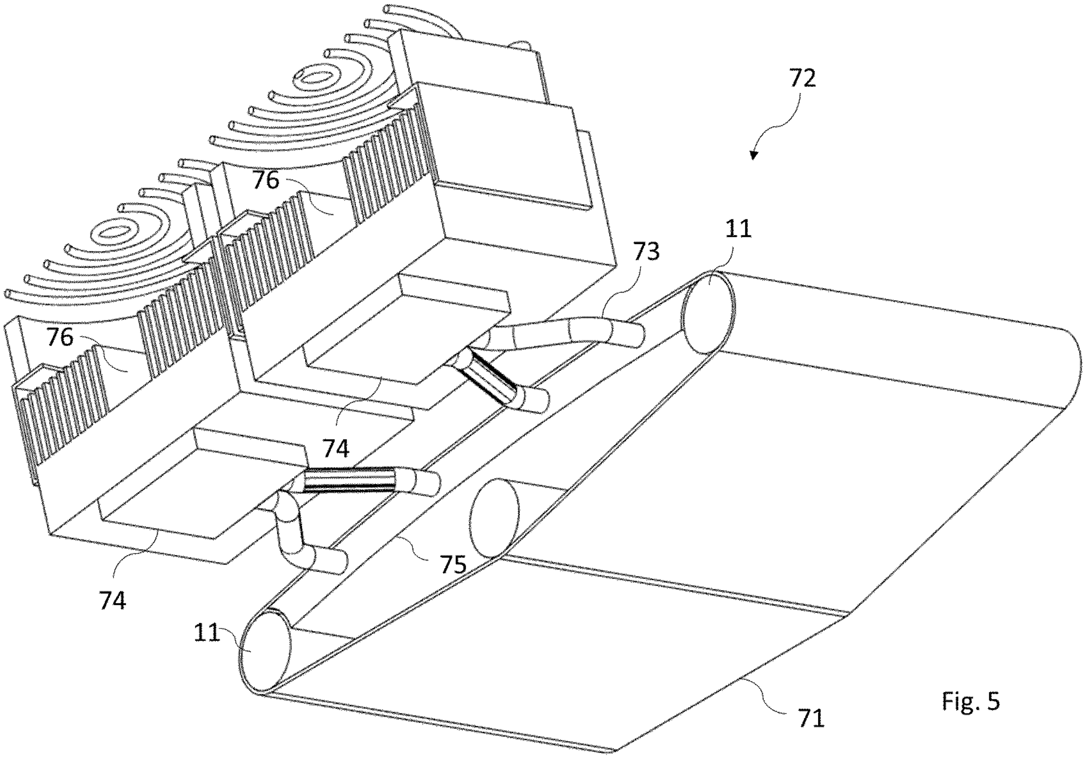
FIG. 5 is another perspective view of the printing apparatus of FIG. 3 wherein the cooler comprises a heat exchanger comprising coils, a condenser and radiators to cool the condenser.

A preferred embodiment of a printing apparatus is now described in reference FIGS. 3 to 5.

The printing apparatus 1 comprises a coater 3 and a printhead 6. The coater 3 coats the endless ribbon 5 to create a layer of ink on one face of the ribbon 5.

The coater 3 may be designed to coat on the ribbon 5 a layer of ink having a thickness ranging from 1 to 8 micrometers. Preferably, the coater is deigned in such a way that the thickness of the layer of ink coated is sensibly uniform along the width and along the length of the ribbon 5.

The printhead 6 is arranged to transfer at least a part of the ink 4 on the ribbon 5 on the substrate 20 by thermal transfer.

A conveyor system ensures the displacement of the ribbon 5 along a path to carry the ink 4 from the coater 3 to the printhead 6 in a first path and from the printhead 6 to the coater 3 in a second path, in a cyclic manner. The conveyor system comprises a plurality of rollers 9 to hold and transport the ribbon 5. The conveyor system may also comprise spring-loaded tension roller 10. The spring-loaded tension roller 10 may be attached to a linear slide. The spring-loaded tension roller 10 comprises a spring element loaded and arranged to push or to pull the roller 10 along the linear slide in order to maintain a mechanical tension to the ribbon. In one embodiment, the spring-loaded tension roller 10 is a drive roller.

The conveyor system may also comprise a first conveyor 7 comprising a conveyor belt 71. The conveyor belt 71 of the first conveyor 7 is arranged to hold and transport the ribbon 5 along at least the first portion of its path. The first portion of the path of the ribbon being located in the first path of the ribbon 5 from the coater 3 to the printhead 6. In said first portion of the path of the ribbon, the ribbon carries new ink to the printhead 6. The first conveyor 7 comprises three rollers to hold and transport the conveyor belt 71.

The first conveyor 7 comprises a first guiding element 75 to hold and transport the part of the conveyor belt 71 holding and transporting the ribbon 5. The first guiding element 75 indirectly holds and transports the ribbon 5 through the conveyor belt 71, at least along the first portion of the path of the ribbon 5.

Example of Cooler

As illustrated, the first guiding element 75 is coupled to a cooler 72. In this example, the cooler 72 comprises a heat exchanger arranged to cool down the first guiding element 75. The cooler 72 comprises radiators 76 to cool down the coolant of the heat exchanger. The heat exchanger may also comprise a condenser 74. The radiators 76 are arranged to cool down the condenser 74.

In one embodiment, the coolant is an alcoholic solvent. The advantage of such coolant is its low boiling point. In this embodiment, in the contact of the first guide element 75, the coolant is boiling, leading to a high loss of heat of the first guiding element 75. In the condenser, the coolant returns to a liquid form.

In the example illustrated in FIG. 5, the heat exchanger comprises coils 73 to guide the coolant between the first guiding element 75 and the condenser 74. In one embodiment, the rollers 11 of the first conveyor system are also coupled to the cooler 72 to improve the cooling of the ink 4.

In one embodiment, the coils 73 are heat pipes.

Heat pipes comprises an evaporator section and a condenser section. The evaporator section is comprised in the first guiding element 75. The condenser section is comprised in the condenser 74.

Heat applied externally to the evaporator section is conducted through the heat pipe wall and wick structure, which vaporizes the coolant. Resulting vapor pressure drives the vapor through the pipes via an adiabatic section to the condenser 74 where the vapor condenses, relative to its latent heat vaporization to the provided heat sink. The capillary pressure created by the meniscus in the heat pipes pumps the condense coolant back to the evaporator section. Therefore, the heat pipe can continuously transport the latent heat of vaporization from the first guiding element 75 to the condenser 74, without any mechanical pump means. This process will continue as long as there is a sufficient capillary pressure to drive the condense coolant back to the evaporator. The conditions of the orientation and the architecture of such heat pipes to operates are well known from the skilled person.

Heat pipes advantageously allow to reduce the volume of the heat exchanger. The condenser 74 may be cooled to continue the condensation of the coolant with radiators 76 and/or with a Peltier heat pump. Heat pipes further advantageously allows avoiding any mechanical pumping means for the transport of the coolant.

The cooler 72 described may also be used to cool down the plate described in the second embodiment of the present invention or the cooling roller 100 described in the first embodiment of the present invention.

The cooler 72, through the conveyor belt 71 and through the ribbon 5, is configured to cool down the ink 4 at a predefined temperature. The advantage is to cool down the ink 4 at least below its melting temperature. In such way, the ink 4 on the ribbon 5 arriving underneath the printhead 6 is in a solid state, independently of the ambient temperature where the printing apparatus is used.

Preferably, the conveyor belt 71 comprises a metal sheet to advantageously improve the thermal conductivity between the ink 4 and the first guiding element 75. Preferably, the thickness of the ribbon 5 is lower than 30 μm or 25 μm to advantageously improve the thermal conductivity between the ink 4 and the first guiding element 75.

In one embodiment, the power to apply to cool down the ink may be comprised between 1500 and 6000 Watt/m of ribbon at a 1 m/s ribbon speed when the thickness of the layer of ink on the ribbon is ranging from 2 to 7 μm and when the thickness of the ribbon constituted in polyimide is ranging from 5 to 25 μm. The power to apply to cool down the ink may be proportional to the ribbon speed, to the thickness of the layer of ink or to the thickness of the ribbon of polyimide.

Additional Conveyor System to Heat the Ink

In one embodiment, the conveyor system further comprises a second conveyor 8 comprising a second conveyor belt 81. The second conveyor belt 81 holds and transport the ribbon 5 on the second portion of its path. Preferably, the second portion of the path of the ribbon comprises at least a part of the second path of the ribbon. In other words, the second conveyor belt 81 holds and transports the ribbon 5 at least on a portion of the path from the printhead 6 to the coater 3. The second conveyor belt 81 may also hold and transport the ribbon 5 on the third portion of its path. Preferably, the third portion of the path of the ribbon comprises at least a part of the second path of the ribbon. In other words, the second conveyor belt 81 holds and transports the ribbon 5 at least on a portion of the path from the coater 3 to the first portion cooled by the cooler.

The second conveyor 8 comprises at least one second guiding element 85 and/or the rollers holding and transporting the second conveyor belt 81 coupled to a heater 82. The heater 82 is configured to heat the ink 4 at a second predefined temperature. Preferably, the second predefined temperature is above the melting point of the ink 4. The melting to make the ink to flow before arriving to the coater 3 advantageously allows to melt and flow the ink on the ribbon 5 to improve the homogeneity of the ink layer on the ribbon after coating. Such heating further improves the recuperation of the remaining ink before coating (non-illustrated).

The heater is configured to heat the ribbon on the second portion and/or the third portion of the path of the ribbon. The second portion may also include a section wherein the coater coats the ribbon 5. This advantageously allows heating the ink 4 on the ribbon 5 during the coating process to improve the homogeneity of the ink layer on the ribbon 5. Indeed, the heating avoids a quick solidification of the ink 4 in contact with the ribbon 5 and decreases the viscosity of said ink 4, allowing homogeneous spreading of the ink on the surface of the ribbon. In one embodiment, the third portion comprises a part of the first path of the ribbon extending from the coater. This advantageously allows heating the ink just after the coating process to further improve the homogeneity of the thickness of ink on the ribbon. In other words, as illustrated in FIG. 3, the heating device may be arranged to heat the ink on the ribbon in a portion of its path located before and after the coater 3, and before the section cooled by the cooler 72.

In one embodiment, the printing apparatus 1 may comprise a frame 12. The frame 12 includes the coater 3, the printhead 6 and the path of the ribbon 5. The frame 12 comprises at least one aperture 15 for the exit of the substrate 20 printed. In one embodiment, the printing apparatus 1 further comprise isolating walls 14. The isolating walls 14 are arranged to separate the first portion of the path of the ribbon cooled and the second portion and/or the third portion of the path of the ribbon heated. The isolating walls 14 may comprise apertures for the passage of the ribbon 5. As illustrated in FIG. 4, the isolating walls 14 may extend from the frame 12 of the printing apparatus 1. The isolating walls 14 isolate the coater 3 and the heater 82 from the first portion of the path of the ribbon wherein the ink is cooled by the cooler 72. One advantage is to contain the heat provided by the heater 82 and by the coater 3. In such a way the power to apply to the cooler 72 to cool down the ink 4 to the first predetermined temperature can be reduced. The isolating walls 14 can be made of an isolating material. In one embodiment, the isolating walls 14 comprises mineral wool.

In one embodiment, the printing apparatus 1 comprises two printing rollers 21 to guide the substrate 20 to the printhead 6. As illustrated, the printing apparatus 1 further comprises a third guiding element 22 to hold and transport the substrate 20 and the ribbon 6 along a predefined length to the printhead 6.

In one embodiment, the printing rollers 21 and/or the third guiding element 22 is coupled to a heater and/or to a cooler to control the temperature of the ink 4 on a fourth portion of the first path. The fourth portion is located on the first path of the ribbon, preferably between the first portion and the printhead. In one embodiment, the fourth path extends from the printhead along a predefined length on the first path of the ribbon 5. This allows providing ink to an optimized temperature to ensure a high-quality printing by thermal transfer. In a preferred embodiment, the cooler and/or the heater to control the temperature aims to control the temperature of the ink 4 targeting a third predefined temperature. The third predefined temperature is determined to be a few degrees below the melting point of the ink. It advantageously allows decreasing the energy to be transferred to ensure thermal transfer and to increase the speed of printing without losing in printing quality.

Cooling Parameters

In one embodiment, the length of contact between the cooling plate the conveyor belt 71 or the length between the cooling roller 100 and the ribbon 5 is superior to 15% of the first path of the ribbon 5 from the coating device 3 to the printhead 6. In one embodiment, the length of contact between the ribbon 5 and the cooling plate 75, the conveyor belt 71 or the cooling roller 100 ranges from 5 to 30 cm. Preferably, the circumference of the cooling roller or the length of the conveyor belt ranges from 10 to 60 cm.

Figure 10:
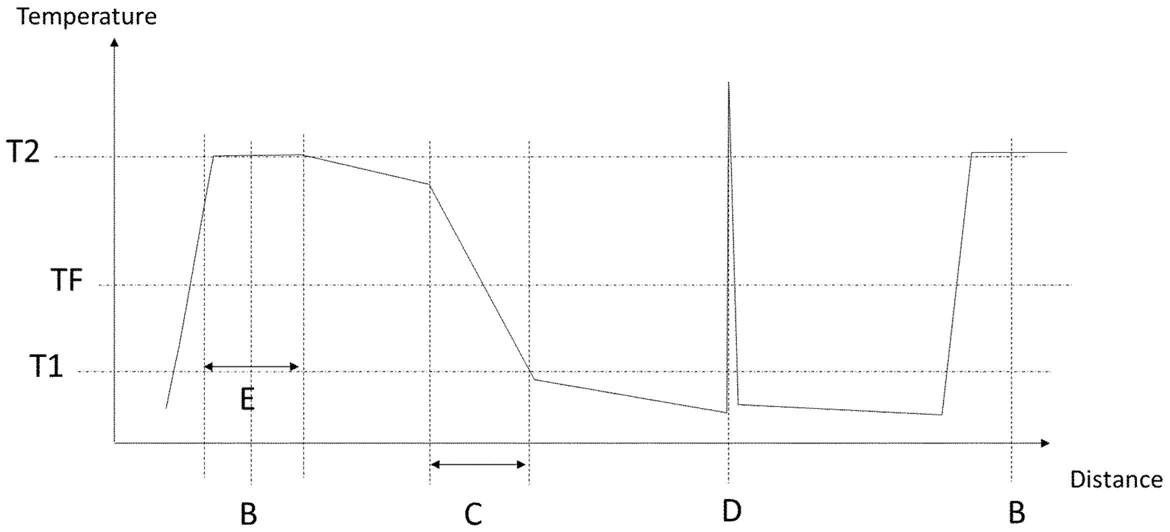
FIG. 10 is a diagram of the thermal cycle of the ink on the ribbon along its transport in the thermal printing apparatus according to one embodiment of the invention.

The graphic illustrated in FIG. 10 shows the level of temperature of the coated ink on the ribbon along the transport of the ribbon (graphic unscaled).

In a first step E the ink on the ribbon is heated on both sides of the coating device B along a distance corresponding to the third portion of the path of the ribbon. On this portion, the ink is heated at the second predefined temperature T2 which is superior to the melting point TF of the ink. In one embodiment, the second predefined temperature T2 is superior to the glass transition temperature of the ink.

In one embodiment, the printing apparatus includes a support roller. The support roller is arranged and designed to support the ribbon along a portion of its path comprising the coating zone. Preferably, said roller comprises heating means to heat the ribbon in contact with it.

In a second step, the ink on the ribbon arrives on a portion of the path of the ribbon wherein the ink is cooled down. The portion C corresponds to the portion of the ribbon in contact with the plate 75, the conveyor belt 71 or the cooling roller 100. At the end of this portion C, the temperature of the ink drops to the first predefined temperature T1. The first predefined temperature T1 is inferior to the melting point TF of the ink, preferably is inferior to 20° C. less than the melting point TF of the ink.

On a third step, the ink is locally heated in an area D in the vicinity of the printhead to perform thermal transfer of the ink from the ribbon 5 to the substrate 20. Therefore, the ink in this area D is heated above its melting point TF to perform said thermal transfer. In this area D, the ink may be heated above or below the second predefined temperature T2.

Then, the remaining ink on the ribbon is transported from the printhead to the coating device B to be recoated as explained in the first step.

One advantage of the cooling plate in direct contact with the ribbon is that the temperature of the ink is easier to control.

One further advantage of the invention is to reach a better control of the solidification of the coated ink. The invention advantageously allows a reduction of the length of the ribbon between the coating device and the printhead. Therefore, the invention allows reducing the volume of the printing apparatus. Preferably, the length of the endless ribbon 5 is inferior to 150 cm, more preferably comprised between 40 cm and 110 cm.

Preferably, the length of the first path of the ribbon (i.e., the length of the coated ribbon) ranges from 20 cm to 80 cm, preferably from 30 to 50 cm.

The invention further provides a more controlled cooling of the ink, and advantageously allows to cool down the coated ink enough to prevent the ink from sticking to the substrate. Complete solidification of the ink is therefore obtained, and the ink layer remains tack free during printing.

In one embodiment, the printing apparatus is designed and configured to cool down the coated ink on the ribbon in such a way that the temperature of the ink arriving in contact with the substrate is inferior to 60° C. or less than 20° C. below its melting point.

The invention advantageously provides a cooling process of the ink to of the ribbon allowing the ink to reach such temperature when the length of the coated ribbon (i.e., the length of the first path) is less than 80 cm and the speed of the ribbon is superior to 1 m/s.

Furthermore, the invention allows using the printing apparatus in a large range of environments or climatic conditions. Indeed, the temperature of the first convex surface is controlled by the cooler 72. The power used by the cooler may depend on the environmental conditions (temperature, humidity, pressure). Therefore, the present invention allows a printing process standardized worldwide.

Indeed, the invention ensures that the temperature of the ink arriving in the printing zone wherein the printhead is in contact with the ribbon is equal or inferior to the first predefined temperature.

The invention claimed is:

1. A thermal transfer printing apparatus comprising:

a frame, an endless ribbon comprising an inner and an outer face, to transport ink on its outer face, a coating device to coat the endless ribbon with ink, a printhead to print by thermal transfer a substrate with a part of the ink coated on the endless ribbon, a plurality of first rollers supporting and transporting the endless ribbon by its inner face along a path from the coating device to the printhead and from the printhead to the coating device, a plate to support the inner face of the endless ribbon between two adjacent first rollers along its path from the coating device to the printhead, said plate being fixed in translation and in rotation with the frame and having a first convex surface supporting the inner face of the ribbon, and a heat exchanger designed to cool down the first convex surface of the plate at a first predefined temperature.

2. The thermal transfer printing apparatus according to claim 1, wherein the first convex surface of the plate is arranged in direct contact with the endless ribbon.

3. The thermal transfer printing apparatus according to claim 1, further comprising:

at least two second rollers;

a conveyor belt supported by the at least two second rollers and by the first surface of the plate and arranged to support and transport the endless ribbon by its inner face;

wherein the second roller and the plate are arranged so that the first surface of the plate supports the endless ribbon through the conveyor belt.

4. The thermal transfer printing apparatus according to claim 2, further comprising an absorbent material designed to absorb lubricant thereon and arranged to be in contact with the inner face of the ribbon between the coating device and the plate, and further comprising a lubricant reservoir to stock a lubricant and means to transport lubricant from the lubricant reservoir to the absorbent material.

5. The thermal transfer printing apparatus according, to claim 1, further comprising at least one heater, fixed in translation with the frame, and arranged to heat a first portion of the endless ribbon, wherein the first portion of the endless ribbon comprises a coating zone of the ribbon wherein the ribbon is coated by the coating device or is in contact with the coating device.

6. The thermal transfer printing apparatus according to claim 5, wherein the plate comprises a core having a cavity wherein a coolant is circulating in order to cool an outer face of the core, said outer face being arranged to support the ribbon.

7. The thermal transfer printing apparatus according to claim 5, wherein the heater comprises a roller arranged to support the inner face of the ribbon on its circumferential surface and means for heating said circumferential surface of the roller.

8. The thermal transfer printing apparatus according to claim 7, wherein the means for heating said circumferential surface of the roller comprises an electric resistance to heat the second guiding element by Joule heating.

9. The thermal transfer printing apparatus according to claim 1, wherein a length of the endless ribbon is inferior to 150 cm.

10. A method for thermally print a substrate comprising:

providing a thermal transfer printing apparatus according to claim 1;

transporting the endless ribbon holding ink thereon from the coating device to the printhead and from the printhead to the coating device in a cyclic manner;

coating the outer face endless ribbon with ink with the coating device;

cooling the plate supporting the inner face of the endless ribbon to solidify the coated ink, and printing by thermal transfer a substrate with a part of the ink coated on the outer face of the endless ribbon with the printhead.

11. The method according to claim 10, further comprising actuating a heater to heat the ink on the ribbon above its melting point or above its glass transition temperature on both sides of the coating device.

* * * * *